3,554,796

METALLIZATION OF TITANATE WAFERS

William H. Liederbach, Carmel, Ind., and Leopold Pessel, Wyndmoor, Pa., assignors to RCA Corporation, a corporation of Delaware No Drawing. Filed May 20, 1968, Ser. No. 730,647
Int. Cl. H01b 1/02, 1/06
U.S. Cl. 117—227 4 Claims

ABSTRACT OF THE DISCLOSURE

A substance adapted to provide gold, silver or mercury by the decomposition of a compound containing these elements is included in a metallizing composition for ceramic wafers to prevent cracking of the wafers during the firing of the metallizing composition.

BACKGROUND OF THE INVENTION

This invention relates to the metallization of ceramic bodies such as, for example, titanate ceramic wafers used as capacitor dielectrics. More particularly, the invention pertains to a metallizing method and composition for such ceramic bodies.

Titanate ceramics are useful as capacitor dielectrics because they have high dielectric constants. These materials can be made extremely thin, so that relatively high capacitance parallel plate capacitors can be made in very small sizes. The titanates are preferably metallized with coatings which are composed of gold or silver in major proportion and platinum or palladium in minor proportion.

Silver alone is not desirable for metallizing titanate ceramics because silver migrates into the ceramic, in the presence of moisture, and thereby degrades the dielectric. Compounds containing gold as the major metal component are free of this problem but are undesirable for circuit applications because, in subsequent solder joining operations, the gold dissolves rapidly in the molten solder with the result that the adhesion between the metal and the ceramic is broken. The presence of platinum or palladium in a silver metallizing composition eliminates silver migration but introduces an equally serious problem, namely, cracking of the thin ceramic wafers during the firing thereof.

SUMMARY OF THE INVENTION

It has been found that the cracking of silver-palladium metallized titanate ceramic wafers is the result of localized heating which produces thermal stress sufficient to rupture the wafers. More particularly, it has been found that the cracking results from a sudden exothermic reaction which occurs in the metallizing composition during the time the metallized wafers are being brought up to firing temperature. The reaction is apparently catalyzed by the platinum or palladium in the metallizing composition.

The present metallizing composition includes a suspension of finely divided platinum or palladium in an organic vehicle. The composition contains, in addition, a substance which will inhibit or prevent an exothermic chemical reaction during the firing cycle. The inhibiting substances are compositions which contain compounds of gold, silver, or mercury and which decompose, when heated, to yield these elements.

THE PREFERRED EMBODIMENT

The titanate ceramics which suffer from the cracking problem described above, and with which the present novel metallizing composition has particular utility, contain inorganic materials, including barium titanate in major proportion, and a temporary organic binder. A typical composition for the inorganic portion of the ceramic is as follows:

| | Percent by wt. |
|---|---|
| $BaTiO_3$ | 74.90 |
| $CaTiO_3$ | 5.92 |
| $SrTiO_3$ | 10.16 |
| $CaZrO_3$ | 5.72 |
| $MgZrO_3$ | 1.38 |
| $CeO_2$ | 0.49 |
| $UO_3$ | 1.43 |

The organic vehicle used with this titanate mixture is composed as follows:

| | Parts |
|---|---|
| Toluene | 148 |
| Isoproponol | 180 |
| N-alkyl trimethylene diamine [1] | 2 |
| Dibutyl phthalate | 64 |
| Vinyl butyrol resin | 56 |
| Epoxy resin [2] | 25 |
| Methylethyl ketone | 25 |

[1] E.g., "Duomeen," Armour and Co., 1355 W. 31st St., Chicago, Ill.
[2] E.g., "Epi-Rez," Jones Dabney Co., 1481 S. 11th St., Louisville, Ky.

In one process of manufacturing capacitors, the titanate mixture is ball milled with a small percentage of the binder. The composition is then dried and pressed into pill form, after which it is fired at temperatures of 2200° F. to 2600° F. In another process, in which the present metallizing composition has particular utility, the ceramic composition is made in high viscosity form, doctor bladed to a desired thickness, dried at moderate temperature, and then fired. Thereafter, the ceramic is metallized, typically with a silver-palladium composition as noted above, and the metallization is fired at about 700° to 800° C.

The following are examples of metallizing compositions which will not produce an exothermic reaction when they are fired. In general, each composition comprises a suspension of silver and either platinum or palladium together with a substance containing a compound which, when heated, decomposes to yield gold, silver or mercury.

EXAMPLE I

One example of the present metallizing composition is a mixture of 90% silver-palladium metallizer and 10% gold resinate, as the reaction inhibitor. These percentages and those used throughout the following examples are percentages by weight. The silver-palladium metallizer has the following composition:

| | Percent by wt. |
|---|---|
| Silver (powder) | 41.55 |
| Palladium (powder) | 15.68 |
| Lead borosilicate glass (powder) | 2.35 |
| Bismuth trioxide | 11.70 |
| Glycerol ester of hydrogenated rosin | 16.0 |
| Nitrocellulose | 2.0 |
| Butyl Carbitol acetate | 10.72 |

In this composition, the palladium and silver provide the conductive characteristic of the composition. The lead borosilicate glass and bismuth trioxide are used as a flux and to aid in bonding the metallization to the ceramic. The glycerol ester of hydrogenated rosin is the organic binder, and the nitrocellulose acts as a viscosifier. Finally, the butyl Carbitol acetate is a solvent for the other organic constituents.

In the present example, the gold resinate is a commercially available composition known as "Liquid Bright Gold," No. 4063, from E. I. du Pont de Nemours & Co., Wilmington, Del., the composition by weight of which is as follows:

| | Percent |
|---|---|
| Gold | 9.87 |
| Vanadium | 0.25 |
| Rhodium | 0.05 |
| Chromium | 0.14 |
| Organic resin and solvent | 89.69 |

The metallizer and the gold resinate are thoroughly mixed and applied to the titanate ceramic in any desired manner, as by brushing or spraying. The thickness of the metallizing composition is ordinarily measured as a percentage of the weight of the ceramic wafer and may be in the range of 5 to 55%. In this example, the metallizing composition has a thickness corresponding to about 20% of the weight of the ceramic wafer.

After drying the metallization at about 110° C., the metallized ceramic is passed through a furnace maintained at about 700° C. and is kept in the furnace for a time sufficient to sinter the metal particles in the metallization. No cracking of the ceramic takes place under these conditions. Similarly treated wafers in which the gold resinate was omitted were shattered during the firing process.

EXAMPLE II

A second example of the present metallizing composition is comprised of a mixture of 95% of silver-palladium metallizer having the same composition as in Example I and 5% of a platinum resinate known as "Liquid Bright Platinum," No. 40, which may be obtained from Hanovia Chemical Co., Newark, N.J. The composition of this material is as follows:

| | Percent by wt. |
|---|---|
| Platinum | 2.75 |
| Gold | 2.75 |
| Rhodium | 0.05 |
| Bismuth | 0.40 |
| Organic resin and solvent | 94.05 |

The metallizing composition is applied to the ceramic, dried, and fired in the same manner as indicated in Example I, with the result that no cracking of the ceramic takes place.

EXAMPLE III

In this example, the metallizing composition is a mixture of two commercially available materials, namely, a gold-palladium metallizer available from Du Pont and known as Compound No. 7554, and a gold resinate also obtainable from Du Pont and identified as No. 6897. The metallizer, Compound No. 7554, contains 55% gold and 15% palladium, the balance being binder and solvent. The gold resinate, No. 6897, is prepared by first reacting gold chloride with a pinene mercaptan to form gold sulfide. The gold sulfide is then dissolved in a resinate complex to form a clear solution which contains gold in the amount of about 20.5%.

A mixture of 80% of the metallizer, Compound No. 7554, and 20% of the gold resinate, No. 6897, applied to a titanate wafer in a thickness corresponding to 30.5% of the weight of the wafer undergoes no exothermic reaction upon firing.

EXAMPLE IV

In this example, the metallizer is gold-platinum Compound No. 7553, obtained from Du Pont, and the reaction inhibitor is gold resinate, No. 6897, from Du Pont, in the weight ratio of 80% to 20%, respectively. These ingredients are thoroughly mixed and the mixture is applied to the titanate wafers in an amount corresponding to 34% of the wafer weight. No indication of any exothermic reaction occurs when these wafers are fired.

EXAMPLE V

Here, the metallizing composition is Du Pont Compound No. 7554, which contains 55% gold and 15% palladium, the balance being vehicle and binder. The reaction inhibitor is mercurous iodide. When these compositions are applied to a titanate ceramic wafer as a mixture containing 90% of the metallizer and 10% of the inhibitor, in a thickness corresponding to 42% of the wafer weight, no exothermic reaction and no cracking of the wafers takes place.

EXAMPLE VI

A mixture containing Du Pont Compound No. 7554, as in Example V, and silver tartrate in the weight ratio of 9 to 1, respectively, is applied to titanate wafers in a thickness corresponding to 48.5% of the wafer weight. No exothermic reaction and no cracking occur upon firing. Silver lactate may be substituted for the silver tartrate in this example.

The precise mechanism by which the various reaction inhibitors act to prevent the cracking phenomenon is not known. The inhibitors do have in common the release of a metal such as gold, mercury, or silver, when they are heated. This metal may act to poison the catalytic effect of the finely divided platinum or palladium in the metallizing composition and thereby inhibit the exothermic reaction which takes place in their absence.

We claim:

1. A method of forming a highly conductive coating on a surface of a titanate ceramic sheet, comprising
   applying to said surface a coating composition which comprises
      90–95% by wt. of a silver-palladium metallizer composition which comprises a major proportion of powdered silver and palladium, a flux, an organic viscosifier, an organic binder and a solvent for the organic constituents,
      and 5–10% by weight of a gold or platinum resinate,
   and heating the coated ceramic body for a time and at a temperature sufficient to sinter the metal particles in said coating.

2. A method of forming a highly conductive coating on a surface of a titanate ceramic sheet, comprising
   applying to said surface a coating composition which comprises 80–90% by wt. of either a gold-palladium or a gold-platinum metallizer composition which comprises a major proportion of said metals in powdered form, a binder and a solvent for the binder,
   and 10–20% by weight of a gold or platinum resinate,
   and heating the coated ceramic body for a time and at a temperature sufficient to sinter the metal particles in said coating.

3. A method of forming a highly conductive coating on a surface of a titanate ceramic sheet, comprising
   applying to said surface a coating composition which comprises about 90% by weight of a gold-palladium metallizer composition which comprises a major proportion of powdered gold and palladium, a bonder and a solvent for the binder,
   and about 10% by weight of silver lactate or silver tartrate,
   and heating the coated ceramic body for a time and at a temperature sufficient to sinter the metal particles in said coating.

4. A method of forming a highly conductive coating on a surface of a titanate ceramic sheet, comprising
applying to said surface a coating composition which comprises about 90% by weight of a gold-palladium metallizer composition containing a major proportion of said metals in powdered form, a binder and a solvent for the binder,
and about 10% by weight of a mercurous halide,
and heating the coated ceramic body for a time and temperature sufficient to sinter the metal particles in said coating.

References Cited

UNITED STATES PATENTS

| | | | |
|---|---|---|---|
| 2,924,540 | 2/1960 | D'Andrea | 117—227 |
| 3,124,478 | 3/1964 | Cirkler et al. | 117—227X |
| 3,154,503 | 10/1964 | Janakirama-Rao et al. | 252—514 |

WILLIAM L. JARVIS, Primary Examiner

U.S. Cl. X.R.

117—160; 252—514; 106—1